United States Patent [19]

Hatala

[11] Patent Number: 4,916,994
[45] Date of Patent: Apr. 17, 1990

[54] MITER TABLE FOR PORTABLE POWER SAW

[76] Inventor: David G. Hatala, 9329 Jackson St., Philadelphia, Pa. 19114

[21] Appl. No.: 235,417

[22] Filed: Aug. 24, 1988

[51] Int. Cl.$^4$ ............................ B27B 5/16; B27B 9/04
[52] U.S. Cl. .......................................... 83/763; 83/764; 83/471.3; 83/477.2; 83/574; 83/581; 83/829
[58] Field of Search .................................. 83/761-767, 83/823, 829, 574, 477.1, 486.1, 581, 477.2, 471.3

[56] References Cited

U.S. PATENT DOCUMENTS

| | | | |
|---|---|---|---|
| 1,457,492 | 6/1923 | Bloodgood . | |
| 1,646,589 | 10/1927 | Meek et al. | 83/574 |
| 2,558,217 | 6/1951 | Hess et al. | 83/574 |
| 2,568,957 | 9/1951 | Hess | 83/574 |
| 2,804,104 | 8/1957 | Sasso | 143/6 |
| 2,818,892 | 1/1958 | Price | 83/574 |
| 2,911,017 | 11/1959 | Holder | 83/486.1 |
| 3,151,642 | 10/1964 | Olson | 143/47 |
| 3,331,406 | 7/1967 | Christophel | 83/574 |
| 3,815,463 | 6/1974 | Allaire | 83/581 |
| 3,872,755 | 3/1975 | Marsh et al. | 83/471.3 |
| 3,971,274 | 7/1976 | Barton | 83/471.3 |
| 4,181,057 | 1/1980 | Bassett | 83/486.1 |
| 4,320,678 | 3/1982 | Volk | 83/574 |
| 4,350,066 | 9/1982 | Volk | 83/763 |
| 4,800,793 | 1/1989 | McCord, Sr. | 83/486.1 |

Primary Examiner—Douglas D. Watts
Assistant Examiner—Scott A. Smith
Attorney, Agent, or Firm—Eugene Chovanes

[57] ABSTRACT

A guide for a portable circular power saw for cutting wood at an angle. The guide has a circular stationary base which journals an outer member that carries guide tracks over the base. The outer member is rotated on the stationary base. The wood to be cut is supported on the base.

7 Claims, 2 Drawing Sheets

MITER TABLE FOR PORTABLE POWER SAW

BACKGROUND OF THE INVENTION

In both interior and exterior carpentry, wood board and strips are frequently cut at various lengths and at various angles, including right angles. In the past, handsaws were generally used for such cuts but in more recent times, power saws of various sorts including table saws, radial arm saws, band saws, jigsaws, and portable circular power saws have been generally used in place of handsaws.

With handsaws, miter boxes were used for making controlled cuts, but such miter boxes are generally of no use with power saws.

With table saws that have a motor permanently fixed therein, the entire assembly can be adjusted by, for instance, turning the angle of an arm as in a radial saw to get the desired cut. This of course is entirely satisfactory, but requires that a separate tool be present on the job, which is usually a construction site, for such cuts.

Table saws and the like are often not available at construction sites, whereas circular power saws are virtually always available, but angled cuts have been generally difficult to make precisely with such saws since they are held by a person without any guiding arrangement.

Efforts have been made to provide a guide device for portable power saws.

THE PRIOR ART

In some instances, the guide track is fixed and the work is rotated to achieve the desired angle. Examples of such prior art guide devices for portable power saws include U.S. Pat. Nos. 4,320,678 and 4,350,066 which show a fixed track member over a pivoted lower guide member which positions the board to be cut. The guide member and work are turned to the desired angle with respect to the track.

In other instances, the board remains fixed, whereas the track is rotated to the desired angle. An example of such an arrangement is shown in U.S. Pat. No. 4,608,898 which teaches a track arrangement which guides a portable power saw wherein the track is pivoted with respect to the work by means of a protractor assembly secured right on the work. Generally speaking, it is more desirable to rotate the track to angle the saw direction over fixed work than it is to angle the work relative to saw direction, since the board is generally oriented longitudinally of a support, such as a table, and it is awkward to bring the wood in at various angles. By always having the board to be cut oriented in the same direction, regardless of the angle of the cut, boards can be brought to, and removed from the cutting operations in the same orientation.

SUMMARY OF THE PRESENT INVENTION

The present invention provides an arrangement wherein a circular power saw can be guided in a track arrangement wherein the track can be rotated over the work to provide the desired specific angled cut.

The device is in the form of a turntable wherein a circular work supporting interior portion rests on a flat surface and stays stationary. An outer portion having an interior opening conforming to the stationary table, and rotationally journalled by and supported on an inner table, rotates, carrying with it a track which is suspended over the workpiece.

A circular power saw is simply placed in the track and run down the track within guides, over the stationary workpiece, whereby a cut is made.

The work remains stationary while the track over the work is readily adjusted by rotating the outer portion of the turntable over the interior stationary portion of the turntable.

DETAILED DESCRIPTION OF THE DRAWINGS

The mitering table of the invention consists essentially of an inner circular stationary base 20, and an outer rotational member 21 journaled on base 20, and a pair of tracks 22 extending above the inner base and supported by the outer member 21.

Figure 2:
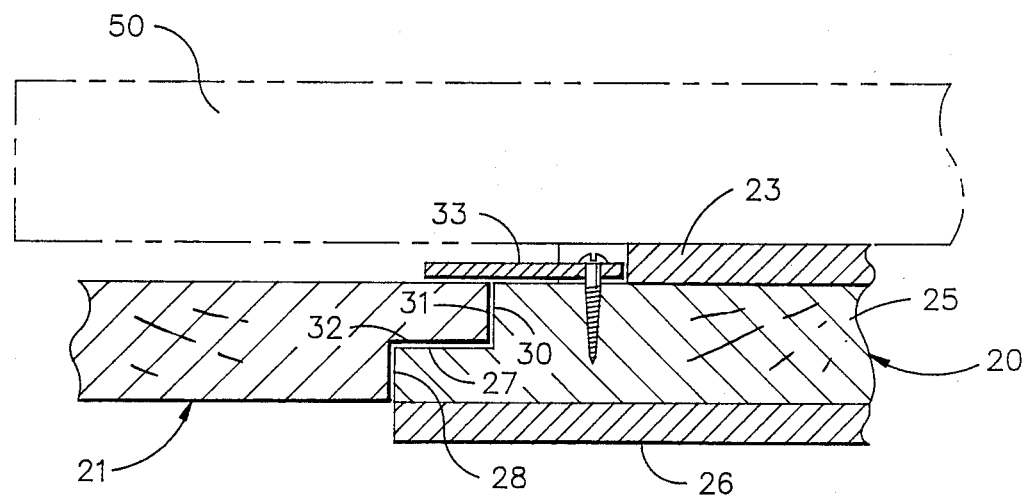
FIG. 2 is a vertical partial section showing the inner stationary table and the outer turntable.
Figure 3:
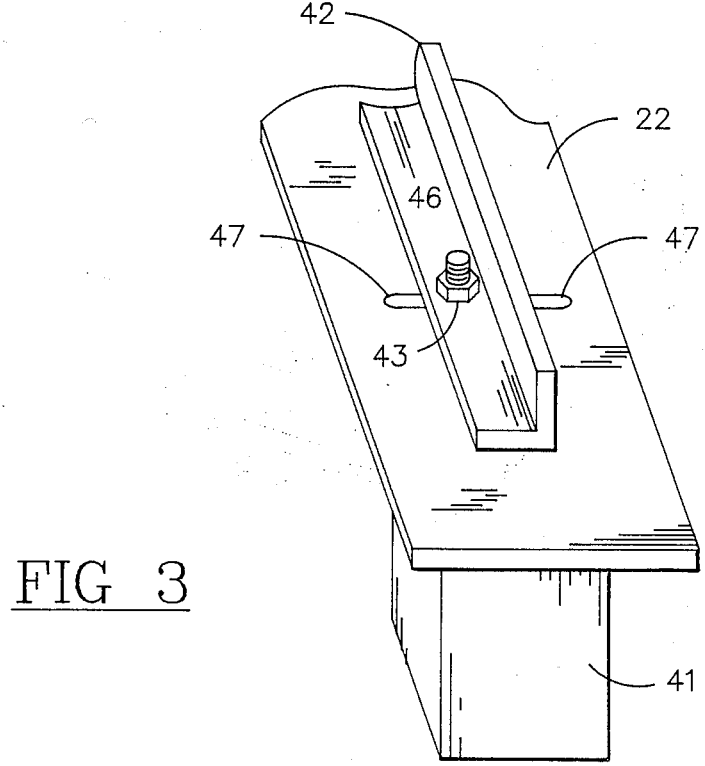
FIG. 3 is a partial perspective view showing one of the tracks.

The base 20 is for instance 18" in diameter and 1¼" in height. As seen in FIG. 2 in section, it is desirably formed by laminating upper 23, middle 25, and lower 26 circular disks together. The upper 23 and lower disk 26 can be of a composite hardboard slightly less in diameter than the middle disk and can be of for instance a ¼" thickness. The middle member can be of solid wood or of a wood composite, and is approximately ¾" thick. The lower disk 26 has a relatively rough surface, as is conventional with the hard pressed board, to provide resistance to movement when the base is resting on a work surface such as a worktable.

Middle disk 25 has a stepped shoulder portion having a flange 27, an outer circumference 28 and an inner circumference 30. The shoulder has a height of approximately ⅜".

Outer rotational member 21 has an inner circular opening 31 conforming in diameter and cross section to the circular base 20. The outer shape of member 21 is a square of approximately 24" on a side. Member 21 is desirably of the same material as middle disk 25 of base 20 and of the same thickness.

Member 21 has a shoulder 32 conforming to shoulder 27 but inverted so that, when member 21 is engaged and fitted on base 20, member 21 is rotationally supported by and journaled on base 20.

Retaining straps 33, suitably two in number and angularly spaced on the base 20, extend radially outward from base 20 and restrain rotational member 21 from being lifted vertically upward relative to base 20. Suitable markings are formed on the base 20 and rotational member 21 as at 35, to provide an index mechanism to indicate rotational movement between base 20 and member 21.

A pair of tracks 22 suitably of a flat metal of for instance 2" in width, and ⅛" in thickness are supported at their ends on member 21. Blocks 41 formed of wood or metal tubes suitably about 2" in height, support the tracks 22 at their ends from member 21. The tracks 22 are spaced about 4" from one another.

The tracks 22 have guides 42 of angle cross section secured to their upper sides by bolts 43 which pass through holes 45 in the flange 46 of the guides 42, and through holes 45 in the flange 46 of the guides 42, and through slotted holes 47 in tracks 22. The distance of the guides from one another is adjusted, in the slotted holes 47, to conform to the width of the apron on the circular saw, so the saw is restrained laterally in the track over the work.

Figure 1:
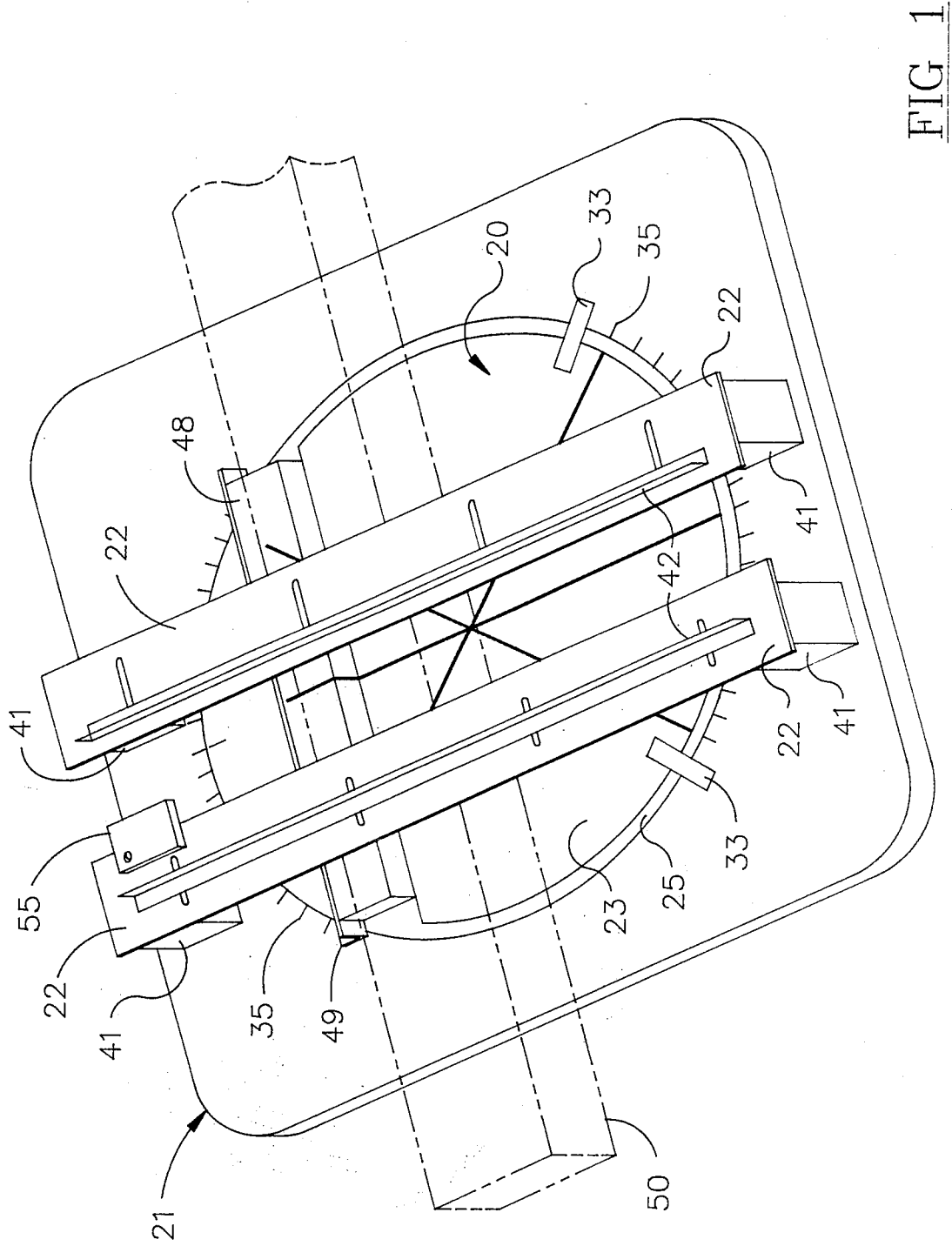
FIG. 1 is a perspective view taken from above of the device of the invention.

A work abutment 48 which is readily replaceable, in the form of a wood block having a cross-sectional dimension of ¼" to 1¾" is secured as by screws to the top of base 20 to provide a straight edge to position the wood. The circular saw blade on the power saw repeatedly enters a saw cut made when the device is initially used, so that generally the abutment can stand long wear. The abutment extends to the edges of the base 20, but not beyond, at a position well removed from the center of base 20, at a forward location below the track, as shown in FIG. 1.

An adjustable saw stop 55 is secured to one of the tracks so that the apron of the circular saw, in a forward position, abuts against the stop at a position in which the workpiece is fully cut and the circular blade enters the wood abutment 48.

In operation base 20 is placed on a stationary surface, such as a worktable. The abutment 48 is positioned so as to be transverse to the operator, so that the wood strip or board extends across the worktable area. The outer member 21 is free to rotate whereby the track can be positioned above the work at the desired angle as indicated by the index marking. The saw is run across the track.

A metal angle 49 is secured to upper disk 23 and abutment 48 as by screws. Angle 49 extends beyond disk 23, over outer member 21 to act with straps 33 to slidably restrain member 21 from being separated from the base 20.

A piece of wood 50 to be cut is shown in phantom in FIGS. 1 and 2.

It should be particularly noted that the relative large diameter of the disk aids substantially in accurately positioning the angle of cut, to obtain a more precise cut in the wood.

I claim:

1. A portable device for controlling the travel of a circular power saw while cutting wood board, comprising
 (1) a circular base having a flat upper surface
  (a) intended to removably rest on a fixed surface during a cut,
  (b) having on its upper surface a straight edge raised element intended to position a wood board on the base,
  (c) having support means on the outer circumference of the base; and
 (2) an outer member having a flat upper surface
  (a) an interior circular opening conforming in diameter to the outer diameter of the base,
  (b) an outer circumference extending beyond the interior opening,
  (c) support means on the interior circular opening intended to cooperate with the support means on the base for rotatably journalling the outer member on the base, and
  (d) a pair of horizontal parallel tracks extending above the base and supported at both ends from the outer member
   (1) the tracks having a horizontal surface on which the circular power saw can be slidably supported, and
   (2) vertically extending portions of the track which laterally restrain movement of the circular power saw while it is positioned horizontally along the tracks;
whereby cuts at different angles can be made through a wood board by a circular saw in a guided manner, by selectively rotationally adjusting the outer member and tracks with respect to the base wherein said flat upper surfaces lie in the same plane.

2. A device of claim 1 wherein the support means on the base and outer member comprises opposing shoulders that interengage.

3. A device of claim 1 wherein the vertical extending portion of the track can be adjusted to provide different track widths.

4. A device of claim 1 wherein indicia have indications on the base and the outer member to indicate angled settings.

5. A device of claim 1 having a stop member at the end of the track for limiting movement of the saw longitudinally in the track.

6. A device of claim 1 having a circular cutable pad fixed on top of the base for providing selectively a cutting groove for receiving the lower edge of the rotating circular saw, said groove being located at periodic angular rotational positions.

7. A device of claim 1 having retaining means disposed above and cooperating with said flat upper surfaces thereon that permits rotation of the outer member and track with respect to the base, but prevents the outer member and track from being disengaged from the base.

* * * * *